United States Patent
Kalass

(10) Patent No.: US 9,799,970 B2
(45) Date of Patent: Oct. 24, 2017

(54) CONNECTING ARRANGEMENT AND CORRESPONDING METHOD

(71) Applicant: MAN Truck & Bus AG, Munich (DE)

(72) Inventor: Rainer Kalass, Rohr (DE)

(73) Assignee: MAN TRUCK & BUS AG, Munich (DE)

( * ) Notice: Subject to any disclaimer, the term of this patent is extended or adjusted under 35 U.S.C. 154(b) by 407 days.

(21) Appl. No.: 14/662,897

(22) Filed: Mar. 19, 2015

(65) Prior Publication Data

US 2015/0270628 A1 Sep. 24, 2015

(30) Foreign Application Priority Data

Mar. 20, 2014 (DE) .................. 10 2014 003 976

(51) Int. Cl.
| | |
|---|---|
| H02G 3/00 | (2006.01) |
| H01R 11/11 | (2006.01) |
| H01R 4/72 | (2006.01) |
| F02M 51/00 | (2006.01) |
| H01B 7/00 | (2006.01) |
| H01B 7/282 | (2006.01) |
| H01R 11/09 | (2006.01) |
| H01R 13/52 | (2006.01) |
| H01R 4/20 | (2006.01) |
| H01R 11/32 | (2006.01) |
| H02G 15/18 | (2006.01) |

(52) U.S. Cl.
CPC ........... *H01R 11/11* (2013.01); *F02M 51/005* (2013.01); *H01B 7/0063* (2013.01); *H01B 7/282* (2013.01); *H01R 4/72* (2013.01); *H01R 11/09* (2013.01); *H01R 13/5205* (2013.01); *H01R 4/20* (2013.01); *H01R 11/32* (2013.01); *H01R 2201/26* (2013.01); *H02G 15/18* (2013.01); *Y10T 29/49195* (2015.01)

(58) Field of Classification Search
None
See application file for complete search history.

(56) References Cited

U.S. PATENT DOCUMENTS

| | | | | |
|---|---|---|---|---|
| 2,688,737 | A * | 9/1954 | Oskerka, Jr. ......... | H01R 13/521 174/50.57 |
| 4,599,487 | A | 7/1986 | Blank et al. | |
| 5,316,492 | A * | 5/1994 | Schaareman ........ | H02G 15/184 174/73.1 |
| 5,660,565 | A * | 8/1997 | Williams ............. | H01R 4/5033 439/425 |
| 6,134,774 | A * | 10/2000 | Williams ............. | H01R 4/5033 29/278 |

(Continued)

FOREIGN PATENT DOCUMENTS

| | | |
|---|---|---|
| DE | 34 12 786 A1 | 10/1985 |
| DE | 10 2008 026 352 A1 | 12/2009 |

*Primary Examiner* — Cassandra Cox

(74) *Attorney, Agent, or Firm* — Lucas & Mercanti, LLP

(57) ABSTRACT

A connecting arrangement for electrically connecting at least two cable ends of electrical cables, in particular of stranded wires, and for providing a hermetic seal between the cable ends has a connection sleeve for receiving the cable ends. The connection sleeve comprises at least a first chamber for receiving one of the cable ends, wherein the first chamber includes a partition wall with respect to the other cable end.

24 Claims, 5 Drawing Sheets

(56) References Cited

U.S. PATENT DOCUMENTS

| | | | |
|---|---|---|---|
| 7,275,949 B1* | 10/2007 | Speaker, IV | H01R 13/5219 439/271 |
| 9,006,570 B2* | 4/2015 | Blakemore | H02G 15/046 174/50.5 |
| 2004/0118590 A1* | 6/2004 | Head | B29C 47/0016 174/105 R |
| 2007/0037435 A1* | 2/2007 | Brus | H02G 15/184 439/404 |

* cited by examiner

CONNECTING ARRANGEMENT AND CORRESPONDING METHOD

CROSS REFERENCE TO RELATED APPLICATIONS

The present application claims priority of DE 10 2014 003 976.5, filed Mar. 20, 2014, which is incorporated herein by reference.

BACKGROUND OF THE INVENTION

The invention relates to a connecting arrangement for electrically connecting at least two cable ends of electrical cables (e.g. stranded wires) and for providing a hermetic seal between the cable ends. Furthermore, the invention relates to a corresponding connecting method.

In modern motor vehicles having an internal combustion engine, the fuel (e.g. petrol or diesel) is generally injected by injectors (e.g. piezo injectors, solenoid injectors) into the combustion chambers of the internal combustion engine or into a pre-chamber. The injectors are controlled electrically by way of injector cable looms that are connected to the individual injectors. This is encumbered with the problem that the environment of the injector contains media (e.g. oil or water) and there is consequently the risk that the respective medium (e.g. oil or water) can penetrate the injector cable loom and spread out within the injector cable loom in the longitudinal direction. It is therefore important that, in the case of an injector cable loom, the medium (e.g. oil or water) is prevented from penetrating the injector cable loom. The prior art does disclose tubular cable lugs that on the one hand render it possible to connect an injector cable loom to the associated injector and on the other hand also perform a sealing function. However, the process of manufacturing these known sealing tubular cable lugs is disadvantageously relatively laborious and therefore expensive.

Furthermore, reference is made with regard to the prior art to DE 10 2008 026 352 A1 and DE 34 12 786 A1.

SUMMARY OF THE INVENTION

The object of the invention is therefore to provide a correspondingly improved connecting arrangement and a corresponding method.

The invention provides a connecting arrangement that is used to electrically connect at least two cable ends of electrical cables (e.g. stranded wires) and produces a hermetic seal between the cable ends, so that media (e.g. oil, water), cannot spread along the cable which is important particularly in the case of an injector cable loom in a motor vehicle.

The connecting arrangement in accordance with the invention comprises initially a connection sleeve for receiving the cable ends that are to be connected one to the other. Fundamentally, a connection sleeve of this type is already known from the prior art (e.g. DE 34 12 786 A1). The connection sleeve in accordance with the invention is characterized by at least a first chamber into which one of the cable ends can be inserted, wherein the first chamber comprises a partition wall with respect to the other cable end. Thus, this partitioning of the connection sleeve into chambers prevents media (e.g. oil, water) from spreading along the cable, since the chamber and in particular the partition wall of the connection sleeve provides a hermetic seal.

In a preferred exemplary embodiment of the invention, the connection sleeve comprises at least two chambers into which in each case one of the cable ends is inserted, wherein the partition wall separates the two chambers of the connecting sleeve in a hermetic manner. The partition wall is thus arranged between the two chambers and prevents media from flowing over between the chambers.

In a further exemplary embodiment of the invention, the connection sleeve comprises in contrast only a single chamber into which one of the cable ends is inserted, whereas the other cable end is electrically connected without a partitioning arrangement. Thus, in this exemplary embodiment, only one cable end is connected in a sealed manner, whereas the other cable end is not sealed. By way of example, this non-sealed end of the connection sleeve can be embodied in a planar manner and from a copper plate on to which multiple strands are then welded from the exterior, by way of example by a friction welding method. Thus, since the chamber of the partition wall forms a hermetic seal, damage cannot occur at this non-sealed end if the contact site is soaked with oil.

The sealing arrangement in accordance with the invention can thus provide a seal in a mono-directional manner (in the case of one chamber) or in bi-directional manner (in the case of two chambers).

In the preferred exemplary embodiment of the invention, a sealing body is arranged in at least one of the chambers of the connection sleeve and said sealing body seals the intermediate chamber between the cable end, which is inserted into the chamber, and the inner wall of the chamber. Consequently, once a cable end has been inserted into the chamber, an annular gap is generally formed between the inner wall of the chamber on the one hand and the peripheral surface of the inserted cable end, wherein this annular gap is then sealed by the sealing body in order to prevent the axial penetration of media (e.g. oil, water).

In a preferred exemplary embodiment, the sealing body is permanently elastic and compensates for different material-specific thermal coefficients of expansion of the cable end (e.g. stranded wire) on the one hand and the connection sleeve on the other hand. The sealing body therefore presses preferably with a radially directed pre-stressing force from inside outwards against the inner wall of the chamber and from outside radially inwards on the peripheral surface of the cable end that is inserted into the chamber.

The sealing body preferably comprises at least one annular circumferential sealing lip that lies against the inner wall of the chamber. By way of example, the sealing body can comprise three or four annular circumferential sealing lips that are arranged one behind the other in the axial direction.

Furthermore, the sealing body preferably comprises an axially extending through-going bore hole through which the cable end is guided.

In a preferred exemplary embodiment of the invention, the connection sleeve is itself electrically conductive in order to electrically connect the two cable ends to one another.

In a further embodiment, the sealing body comprises an axially protruding stop that is used to position the sealing body in the chamber. It is preferred that the stop is arranged on the sealing body on the inner face of the sealing body, i.e. on the face of the sealing body that faces the partition wall and is remote from the insertion opening of the chamber. However, it is alternatively also possible that the stop of the sealing body is arranged on the face of the sealing body that faces the insertion opening of the chamber and is remote from the partition wall of the connection sleeve.

In a preferred exemplary embodiment of the invention, the sealing body is fixed in the chamber in a positive locking manner to prevent its axial displacement out of the chamber. A positive locking connection is provided between the sealing body on the one hand and the connection sleeve having the chamber on the other hand.

By way of example, the connection sleeve can comprise a collar to prevent the sealing body from displacing out of the chamber at an insertion opening of the chamber and the collar protrudes radially inwards and consequently fixes the sealing body in the chamber in a positive locking manner.

However, as an alternative, it is also possible that the sealing body and the inner wall of the chamber comprise positive locking elements that fix the sealing body in the chamber in a positive locking manner. By way of example, the inner wall of the chamber can comprise at least one annular circumferential annular groove into which an annular circumferential sealing rib engages and as a consequence provides a positive locking connection between the annular groove and the annular circumferential sealing rib. However, the invention can also be achieved with respect to the positive locking connection between the connection sleeve and the sealing body using other positive locking elements.

In one exemplary embodiment of the invention, the sealing body is connected to a tubing that protrudes axially from the sealing body and in the assembled state is folded over the outer wall of the connection sleeve so that the tubing encompasses the connection sleeve in the form of a sheath. During the assembly process, the sealing body is then initially inserted with the tubing into the chamber, wherein the tubing then protrudes axially outwards. Subsequently, the tubing is then folded over in such a manner that the tubing encompasses the outside of the connection sleeve in the form of an outer sheath. The tubing is preferably formed as one piece on the sealing body so that the tubing and the sealing body form a unified component. Furthermore, it is to be mentioned that the tubing that is attached to the sealing body extends in the folded-over state preferably over the entire length of the connection sleeve in order to achieve an outer sealing arrangement.

In addition, the connecting arrangement in accordance with the invention can comprise a further tubing (e.g. shrink tubing) that encompasses the outside of the connection sleeve and where appropriate the tubing that is attached to the sealing body, preferably over the entire length of the connection sleeve, in order to produce an outer sealing arrangement.

A suitable tubing material is preferably an elastic material (e.g. rubber) so that it is possible to fold the tubing over and the tubing lies closely against the connecting arrangement. In addition, the tubing material is preferably electrically insulating, fluid-tight and/or gas-tight. It has already been mentioned in short above that the tubing is preferably a shrink tubing that can shrink under the influence of heat and is known per se from the prior art and therefore does not require being described in detail.

The electrical connection between on the one hand the cable ends that have been stripped of insulation and on the other hand the connection sleeve can be produced by way of example by a crimp connection, a solder connection or a weld connection. It is also to be mentioned that the electrical connection between on the one hand the cable ends that have been stripped of insulation and on the other hand the connection sleeve in addition to providing the electrical connection preferably also fulfils a sealing function and for this reason this connection is preferably gas-tight.

Apart from the cable ends that have been stripped of insulation, the electrical cables that are to be connected preferably comprise an insulating material of synthetic material, such as by way of example ethylene tetrafluoroethylene (ETFE) or polytetrafluoroethylene (PTFE). Conventional shrink tubings having an integrated hot melt adhesive are unable to achieve a permanent leak-tightness in the case of high temperature cables comprising the insulation material ETFE or PTFE since these insulating materials fundamentally comprise other materials. However, the connecting arrangement in accordance with the invention also renders it possible in the case of these insulating materials to achieve a good sealing effect. The sealing body that is embodied from the permanently elastic material can encompass the allocated cable end in the region of the insulating sheath so that the sealing body lies on the outside of the insulating sheath.

The invention has been described above for a connecting arrangement that connects the two cable ends in a coaxial manner one to the other. However, the invention is not limited with respect to the arrangement of the cable ends to a coaxial arrangement. In addition, the invention is also not limited with respect to the number of mutually connected cable ends to two cable endings that are mutually connected. Thus, the connecting arrangement in accordance with the invention can also in the case of an appropriate design electrically connect more than two (e.g. three, four, five, six, seven) cable ends to one another. With respect to the geometrical arrangement of the cable ends that are to be connected to one another, it is to be mentioned that the connecting arrangement in accordance with the invention can be by way of example star-shaped, Y-shaped, H-shaped or comb-shaped, to mention just a few examples.

Moreover, it is to be mentioned that the invention not only claims protection for the above described connecting arrangement in accordance with the invention as a single component. In addition, the invention also namely claims protection for an injector cable loom for electrically contacting an injector of an injection system for a combustion engine (e.g. diesel engine) for a motor vehicle (e.g. commercial vehicle), wherein the injection cable loom in accordance with the invention comprises a connecting arrangement in accordance with the invention.

In addition, the invention also claims protection for a combustion engine (e.g. diesel engine, petrol engine) having at least one injector for injecting fuel and having an injector cable loom in accordance with the invention for electrically contacting an injector.

Moreover, the invention also claims protection for a vehicle, in particular a commercial vehicle, having a connecting arrangement in accordance with the invention.

Finally, the invention also includes a corresponding method for electrically connecting multiple cable ends, wherein the individual method steps are already evident from the above description so that it is not necessary to provide a separate description of the method in accordance with the invention.

BRIEF DESCRIPTION OF THE DRAWINGS

Other advantageous further developments of the invention are characterized in the subordinate claims or are explained hereinunder in greater detail together with the description of the preferred exemplary embodiments of the invention with reference to the figures, in which:

DETAILED DESCRIPTION OF THE PREFERRED EMBODIMENTS

Figure 1:
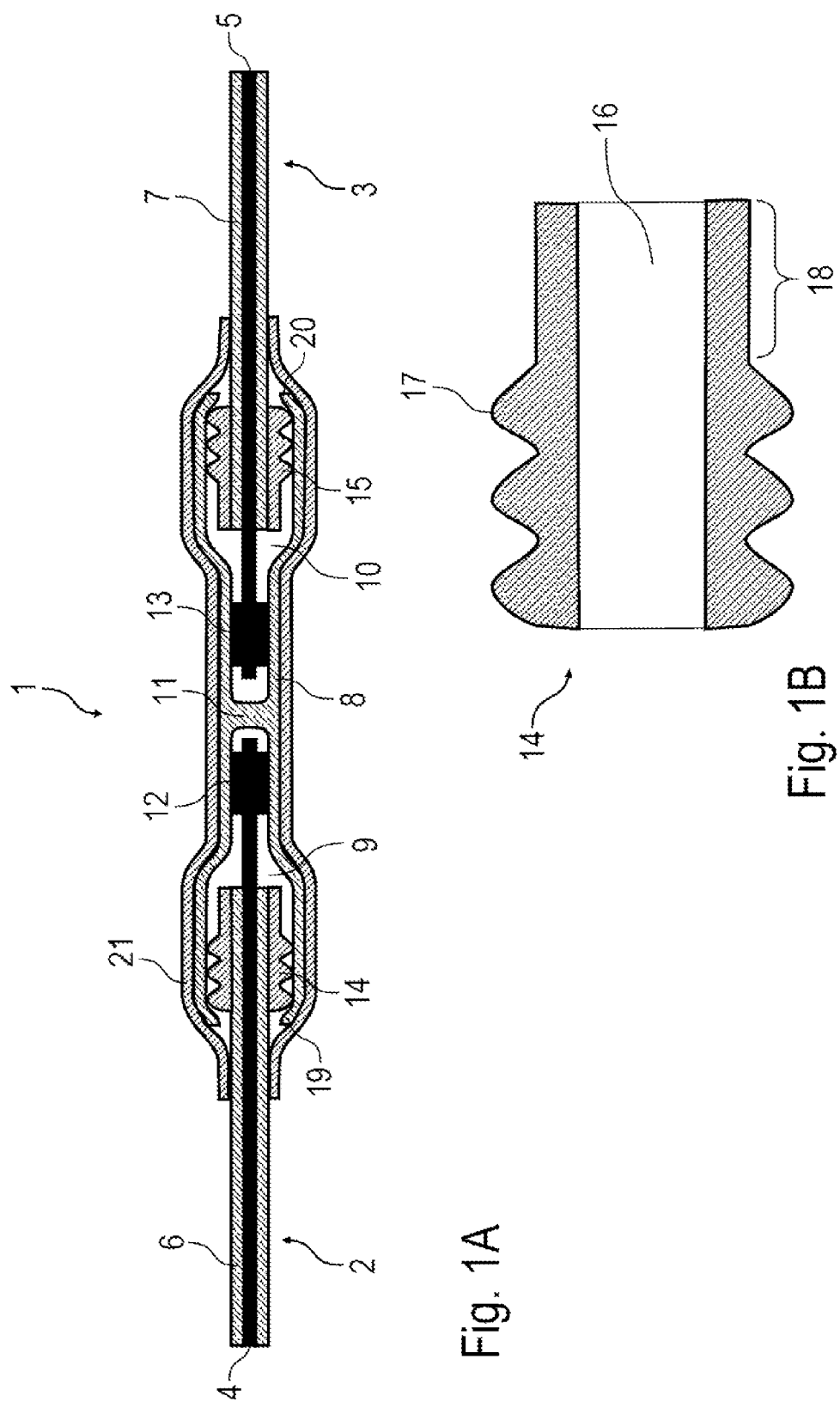
FIG. 1A illustrates a cross sectional view through a connecting arrangement in accordance with the invention that can be used by way of example in an injector cable loom.
FIG. 1B illustrates an enlarged single view of a sealing body from the connecting arrangement shown in FIG. 1A.

FIGS. 1A and 1B illustrate a connecting arrangement 1 in accordance with the invention for electrically connecting two cable ends 2, 3, wherein the connecting arrangement 1 can be by way of example a component of an injector cable loom that is used to electrically control injectors of an injection system for an internal combustion engine.

The two cable ends 2, 3 comprise in each case a stranded wire 4, 5 embodied from copper, and an insulating material 6, 7 embodied from a synthetic material (e.g. ETFE, PTFE) wherein the insulation has been stripped from the free ends of the two cable ends 2, 3.

The connecting arrangement 1 in accordance with the invention comprises a connection sleeve 8 embodied from an electrically conductive material, wherein the connection sleeve 8 comprises two chambers 9, 10 that are separated from one another by a partition wall 11.

The cable end 2 is inserted into the chamber 9 and connected by a crimp connection 12 to the connection sleeve 8 at its free end that has been stripped of insulation.

The other cable end 3 is inserted into the chamber 10 of the connection sleeve 8 and is connected by a crimp connection 13 to the connection sleeve 8.

On the one hand, the two crimp connections 12, 13 provide an electrical connection between the cable ends 2, 3 on one hand and the connection sleeve 8 on the other hand, wherein the connection sleeve 8 as a consequence also provides an electrical connection between the cable ends 2, 3 since the connection sleeve 8 itself is electrically conductive.

On the other hand, the crimp connections 12, 13 also provide a seal of the inner cross section of the chambers 9 and accordingly 10 in the region of the crimp connection 12 and accordingly 13.

In addition, the connecting arrangement in accordance with the invention 1 comprises in each of the two chambers 9, 10 in each case a sealing body 14, 15 that comprises in each case an axial through-going bore hole 16 through which the cable end 2 and accordingly 3 is inserted. The inner wall of the through-going bore hole 16 therefore lies on the outer peripheral surface of the insulating sheath 6 of the cable end 2.

Moreover, it is to be mentioned that the two sealing bodies 14, 15 comprise on the outside three annular circumferential sealing ribs 17 that lie against the inner wall of the chamber 9 and accordingly 10 and as a consequence provide a sealing effect. The sealing ribs 17 are spaced apart from one another in the axial direction and form multiple sealing steps.

Furthermore, it is to be mentioned that the sealing bodies 14, 15 are permanently elastic and exert pre-stressing forces on the inner wall of the chambers 9 and accordingly 10, as a consequence of which different material-specific thermal coefficients of expansion of the cable ends 2, 3 on the one hand and the connection sleeve 8 on the other hand are compensated for.

The two sealing bodies 14, 15 comprise in each case a stop 18 that protrudes in the axial direction from the respective sealing body 14, 15 and, in fact inwards in the direction of the partition wall 11 between the two chambers 9, 10.

In addition, the sealing bodies 14, 15 are held in the chambers 9, 10 by a positive locking connection, wherein the positive locking connection prevents the sealing body 14, 15 from displacing from the chambers 9, 10 in the axial direction. This positive locking connection comprises essentially a collar 19, 20 that is formed as one on the insertion opening of the chambers 9, 10 at the insertion opening edge of the connection sleeve 8 and protrudes radially inwards. This collar 19, 20 comprises an inner diameter that is smaller than the outer diameter of the sealing body 14, 15, so that the collar 19, 20 prevents the sealing body 14, 15 from displacing axially out of the chambers 9, 10.

Due to the chamber arrangement, in particular due to the partition wall 11, the connecting arrangement in accordance with the invention prevents media (e.g. oil, water) from displacing in the longitudinal direction of the cable over the connecting arrangement 1. By way of example, damage cannot occur if oil or water penetrates within the insulation sheath 6 in the cable end 2 since this medium is blocked by the partition wall 11 and can therefore not penetrate into the other cable end 3.

Finally, it is to be further mentioned that the entire connecting arrangement 1 is encompassed on the outside by a shrink tubing 21 in the form of a sheath, wherein the shrink tubing 21 is shrunk under the influence of heat onto the connecting arrangement 1.

Figure 2:
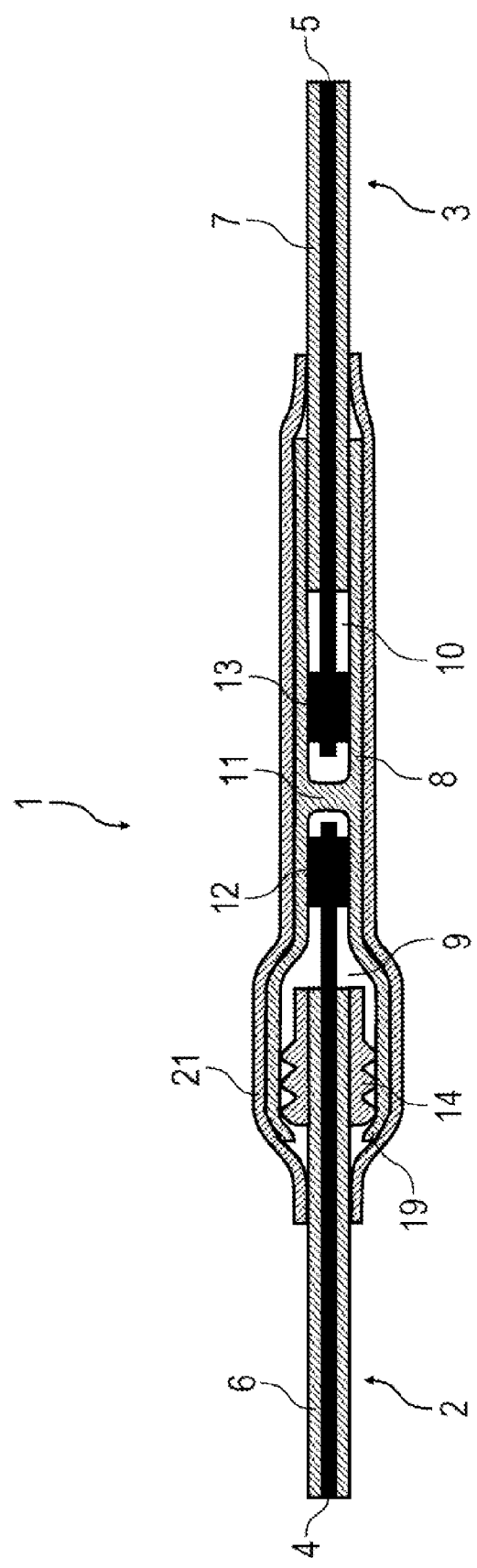
FIG. 2 illustrates a cross sectional view through a modified connecting arrangement having only a single chamber.

The exemplary embodiment in accordance with FIG. 2 coincides to a great extent with the exemplary embodiment that is described above and is illustrated in FIG. 1 so that in order to avoid repetitions reference is made to the above description, wherein like reference numerals are used for corresponding details.

One special feature of this exemplary embodiment resides in the fact that a sealing body is not arranged in the chamber 10 of the connecting arrangement 8.

Figure 3:
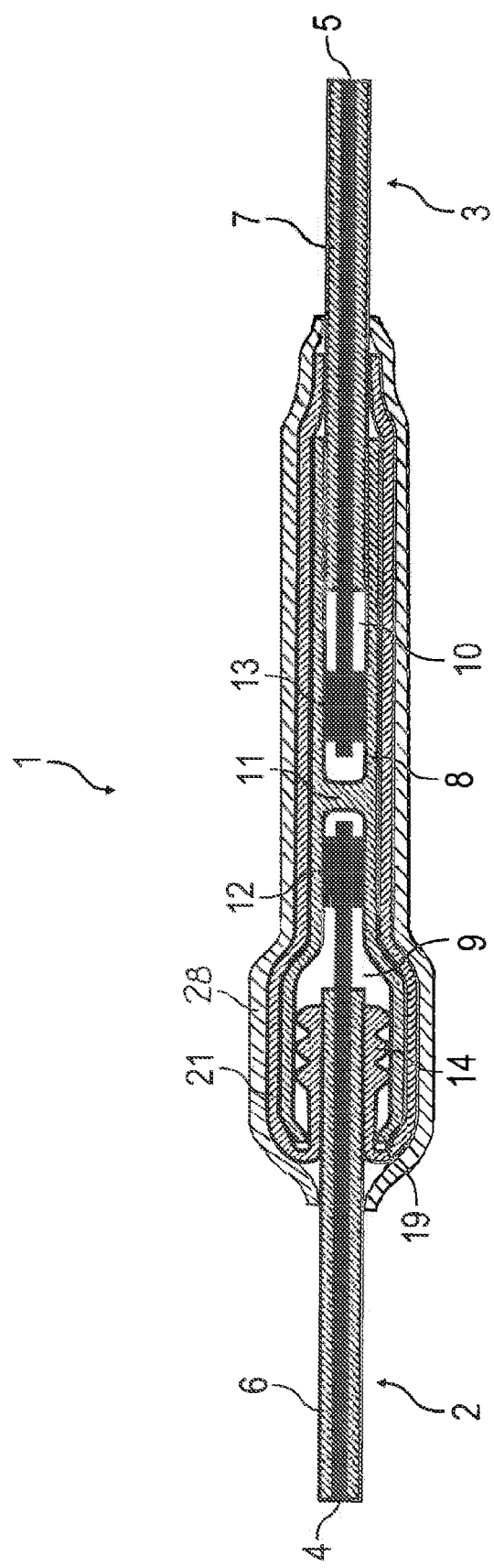
FIG. 3 illustrates a modification of a connecting arrangement in accordance with FIG. 2, wherein a tubing is formed as one on the sealing body and said tubing is folded over the connecting arrangement and encompasses said connecting arrangement in a sealing manner in the form of a sheath.

FIG. 3 illustrates a modification of the exemplary embodiment in accordance with FIG. 2 so that in order to avoid repetitions reference is made to the above description, wherein like reference numerals are used for corresponding details.

One special feature of this exemplary embodiment resides in the fact that the shrink tubing 21 is formed as one piece on the sealing body 14 and initially protrudes axially from the sealing body 14 and protrudes out of the chamber 9. The shrink tubing 21 is then folded over in the drawing towards the right hand side over the entire connecting arrangement and forms then an outer seal in the form of a sheath.

In addition, it is also possible to provide additionally a further tubing 28 that encompasses the shrink tubing on the outside in the form of a sheath. The further tubing 28 shown in FIG. 3 may also be used in the embodiments of FIGS. 1a and 2.

Figure 4:
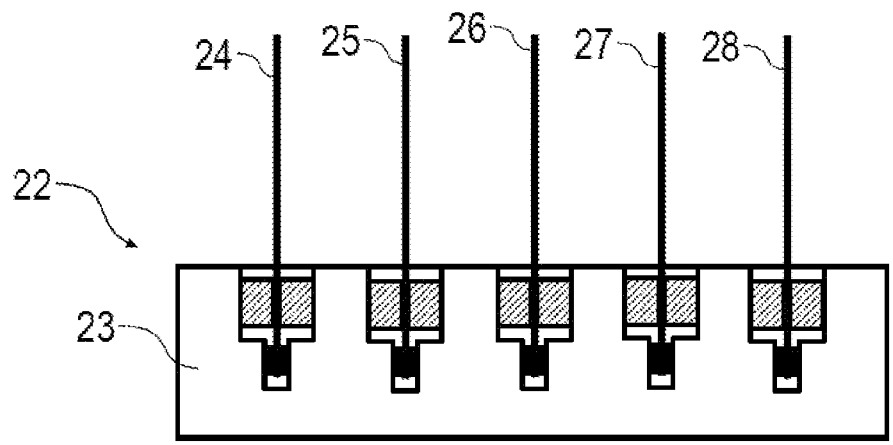
FIG. 4 illustrates a comb-shaped connecting arrangement.

FIG. 4 illustrates a comb-shaped connecting arrangement 22 in accordance with the invention having a connection sleeve 23 for connecting five cable ends 24-28.

The cable ends 24-28 issue from the same side in a similar manner to teeth in the case of a comb into the connection sleeve 23, wherein the cable ends 24-28 are received in each case by a chamber, as has already been described above so that in order to avoid repetitions reference is made to the above description.

Figure 5:
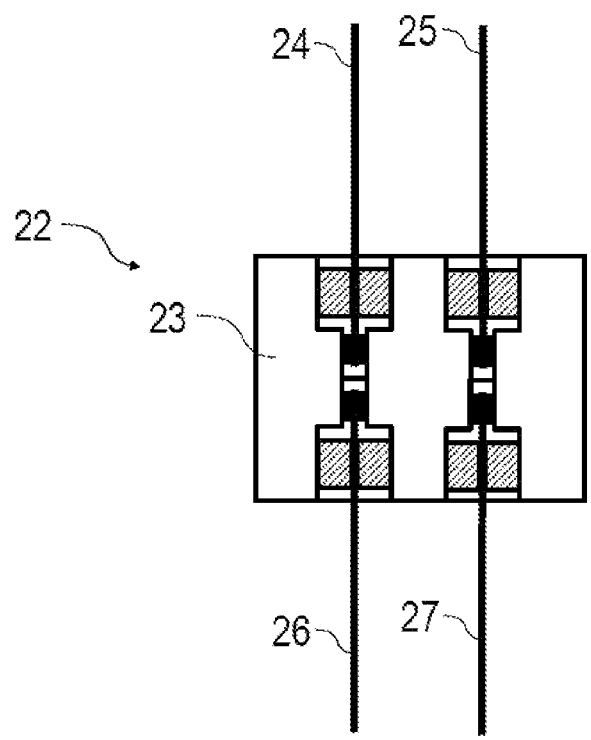
FIG. 5 illustrates a schematic illustration of an H-shaped connecting arrangement.

FIG. 5 illustrates a modification of the exemplary embodiment in accordance with FIG. 4, wherein the cable ends 24-27 enter from different sides in an H-shaped manner into the connection sleeve 23.

Figure 6:
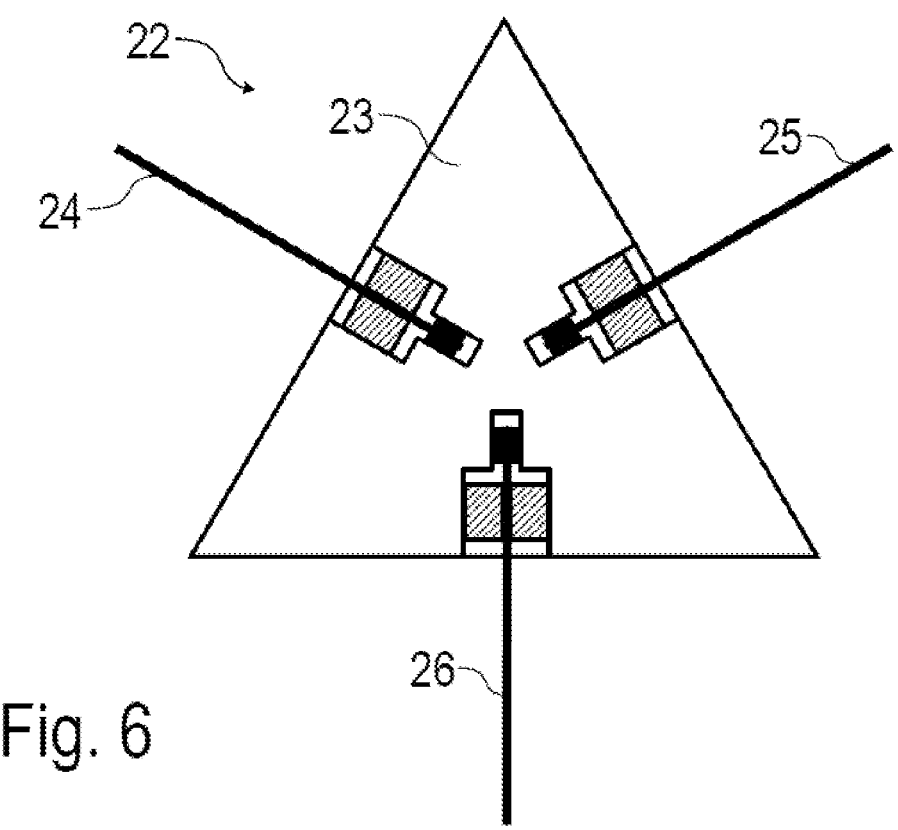
FIG. 6 illustrates a Y-shaped connecting arrangement.

Finally, FIG. 6 illustrates a further modification, wherein the different cable ends 24-26 issue in a Y-shaped manner into the connection sleeve 23 and are received at that site in each case in a chamber, as has already been described above.

The invention is not limited to the above described preferred exemplary embodiments. On the contrary, a plurality of variants and modifications are possible that likewise make use of the inventive idea and therefore are included in the protective scope. In particular, the invention also claims protection for the subject and the features of the subordinate claims independently from the claims to which reference is made.

LIST OF REFERENCE NUMERALS

1 Connecting arrangement
2 Cable end
3 Cable end
4 Stranded wire
5 Stranded wire
6 Insulating material
7 Insulating material
8 Connection sleeve
9 Chamber of the connection sleeve
10 Chamber of the connection sleeve
11 Partition wall
12 Crimp connection
13 Crimp connection
14 Sealing body
15 Sealing body
16 Through-going bore hole
17 Sealing ribs
18 Stop
19 Collar
20 Collar
21 Shrink tubing
22 Connecting arrangement
23 Connection sleeve
24 Cable end
25 Cable end
26 Cable end
27 Cable end
28 Cable end

The invention claimed is:

1. A connecting arrangement for electrically connecting at least two cable ends of electrical cables and for providing a hermetic seal between the cable ends, the connecting arrangement comprising:
a connection sleeve made of electrically conductive material for respectively receiving the cable ends, the connection sleeve having a first chamber for receiving a first one of the cable ends, wherein the first chamber comprises a partition wall with respect to others of the at least two cable ends; and
a first tubing arranged directly over the outside of the connection sleeve over an entire length of the connection sleeve so that the first tubing contacts the connection sleeve, thereby producing an outer sealing arrangement, the first tubing being an elastic and electrically insulating material, and the first tubing being a shrink tubing that shrinks under the influence of heat.

2. The connecting arrangement according to claim 1, wherein
the connection sleeve comprises a second chamber for receiving a second one of the cable ends, the partition wall separating the first chamber and the second chamber from one another in a hermetically sealed manner, or
the connection sleeve comprises only the first chamber for receiving one cable end, whereas the others of the at least two cable end can be electrically connected without chambers.

3. The connecting arrangement according to claim 1, wherein the cable ends, which have been stripped of insulation, and the connection sleeve are mutually connected by an electrically conductive connection that is gas-tight.

4. The connecting arrangement according to claim 1, wherein the connecting arrangement connects more than two cable ends to one another, in a configuration that is one of:
Y-shaped,
H-shaped, and
comb-shaped.

5. An injector cable loom for electrically contacting an injector of an injection system for a combustion engine for a motor vehicle having a connecting arrangement according to claim 1.

6. An internal combustion engine having at least one injector for injecting fuel and having an injector cable loom according to claim 5 for electrically contacting the injector.

7. A vehicle having a connecting arrangement according to claim 1.

8. A connecting arrangement for electrically connecting at least two cable ends of electrical cables and for providing a hermetic seal between the cable ends, the connecting arrangement comprising:
a connection sleeve for respectively receiving the cable ends, the connection sleeve having a first chamber for receiving a first one of the cable ends, wherein the first chamber comprises a partition wall with respect to others of the at least two cable ends; and
a sealing body arranged in the first chamber of the connection sleeve and said sealing body seals an intermediate chamber between the cable end inserted into the first chamber and an inner wall of the first chamber.

9. The connecting arrangement according to claim 8, wherein the sealing body is permanently elastic.

10. The connecting arrangement according to claim 8, wherein the sealing body presses with a pre-stressing force from inside on the inner wall of the first chamber.

11. The connecting arrangement according to claim 8, wherein the sealing body comprises at least one annular circumferential sealing rib that lies against the inner wall of the first chamber.

12. The connecting arrangement according to claim 8, wherein the sealing body comprises a through-going bore for the axial feedthrough of the cable end.

13. The connecting arrangement according to claim 8, wherein the connection sleeve is electrically conductive and electrically connects the at least two cable ends to one another.

14. The connecting arrangement according to claim 8, wherein the sealing body comprises an axial protruding stop.

15. The connecting arrangement according to claim 8, wherein the sealing body is fixed in a positive locking manner in the chamber with respect to displacing in the axial direction.

16. The connecting arrangement according to claim 8, wherein the connection sleeve comprises at an insertion opening of the first chamber a collar that protrudes radially inwards and fixes the sealing body in a positive locking manner in the first chamber.

17. The connecting arrangement according to claim 8, wherein the sealing body and the inner wall of the first chamber comprise positive locking elements that fix the sealing body in a positive locking manner in the first chamber.

18. The connecting arrangement according to claim 8, wherein the sealing body is connected to a first tubing that protrudes axially outwards from the sealing body and in the assembled state is folded over the outer wall of the connection sleeve so that the first tubing encompasses the connection sleeve in the form of a sheath or so that the first tubing extends in the folded over state over the entire length of the connection sleeve.

19. The connecting arrangement according to claim 18, wherein a shrink tubing encompasses the outside of the first tubing.

20. The connecting arrangement according to claim 8, wherein the cable, apart from the cable ends that have been stripped of insulation, comprises an insulating sheath of synthetic material and the sealing body encompasses the associated cable end in the region of the insulating sheath.

21. A method for electrically connecting two cable ends of electrical cables, said method comprising the steps of:
   inserting into a connection sleeve the cable ends, which have been stripped of insulation, the connection sleeve made of electrically conductive material;
   producing an electrical connection between the cable ends that have been stripped of insulation,
   wherein at least one of the cable ends is inserted into a chamber of the connection sleeve, and the chamber is sealed by a partition wall with respect to the other cable end; and
   applying a first tubing over the connection sleeve so that the first tubing encompasses an entire length of the connection sleeve so that the first tubing contacts the connection sleeve, thereby producing an outer sealing arrangement, the first tubing being an elastic and electrically insulating material, and the first tubing being a shrink tubing that shrinks under the influence of heat.

22. The method according to claim 21, wherein the two cable ends are inserted in each case into two respective chambers of the connection sleeve, and the two chambers of the connection sleeve are hermetically sealed from one another by the partition wall.

23. The method according to claim 21, applying a second tubing over the first tubing.

24. A method for electrically connecting two cable ends of electrical cables, said method comprising the steps of:
   inserting into a connection sleeve the cable ends, which have been stripped of insulation;
   producing an electrical connection between the cable ends that have been stripped of insulation,
   wherein at least one of the cable ends is inserted into a chamber of the connection sleeve, and the chamber is sealed by a partition wall with respect to the other cable end; and
   sealing with a sealing body the intermediate space between the cable end that is inserted into the chamber and the inner wall of the chamber, the sealing body being arranged in the intermediate space between the cable end inserted into the chamber and the inner wall of the chamber, and comprising an axial through-going bore hole for the cable end.

* * * * *